United States Patent [19]
Tupper

[11] 3,861,557
[45] Jan. 21, 1975

[54] VENT CAP
[75] Inventor: Willis E. Tupper, Dexter, Mich.
[73] Assignee: Dexter Automatic Products, Co., Inc., Dexter, Mich.
[22] Filed: Aug. 6, 1973
[21] Appl. No.: 385,875

[52] U.S. Cl............................ 220/373, 220/24 GT
[51] Int. Cl............................................. B65d 51/16
[58] Field of Search............ 220/24 R, 24 GT, 44 R, 220/44 A, 24 C; 137/525, 525.1

[56] References Cited
UNITED STATES PATENTS

| | | | |
|---|---|---|---|
| 2,494,653 | 1/1950 | Geffroy | 137/525.1 |
| 2,652,945 | 9/1953 | Walker | 220/44 A X |
| 2,733,775 | 2/1956 | Dupure | 220/44 A X |
| 2,918,192 | 12/1959 | Dedman | 220/44 A |
| 3,155,110 | 11/1964 | Hoffman | 137/525 X |
| 3,302,664 | 2/1967 | Plamann | 220/44 R X |
| 3,356,249 | 12/1967 | Koester | 220/44 A |
| 3,385,468 | 5/1960 | Fleming et al. | 220/44 A |
| 3,388,825 | 6/1960 | Miller | 220/44 R |
| 3,463,346 | 8/1969 | Mitchell | 220/24 C X |

Primary Examiner—John Petrakes
Attorney, Agent, or Firm—Olsen & Stephenson

[57] ABSTRACT

A cap for a fuel tank such as is used with gasoline engines for chain saws, power mowers, snowmobiles and the like, which require venting of the tank without danger of fuel leakage resulting from return flow through the vent passageway. The cap has a plastic body in which is molded vent apparatus including the complete vent passageway and a check relief valve that is encapsulated within the passageway.

8 Claims, 4 Drawing Figures

PATENTED JAN 21 1975
3,861,557
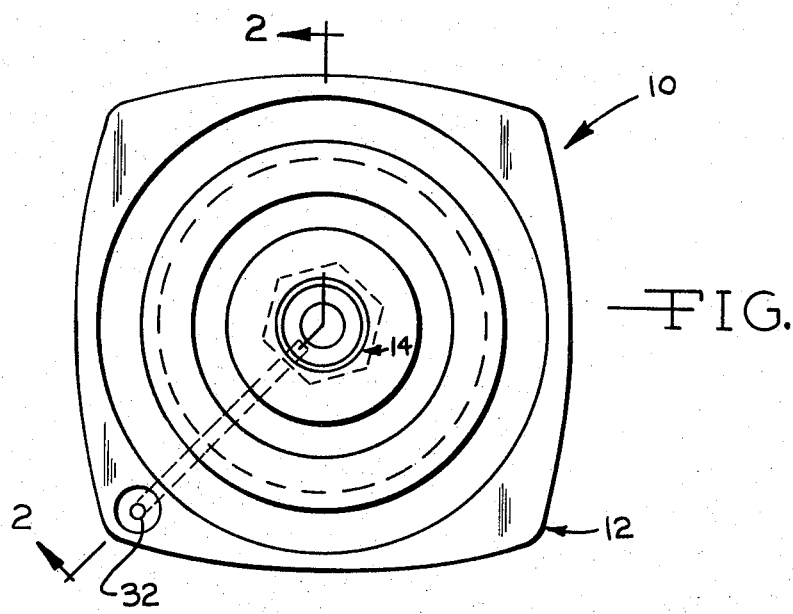
FIG. 1
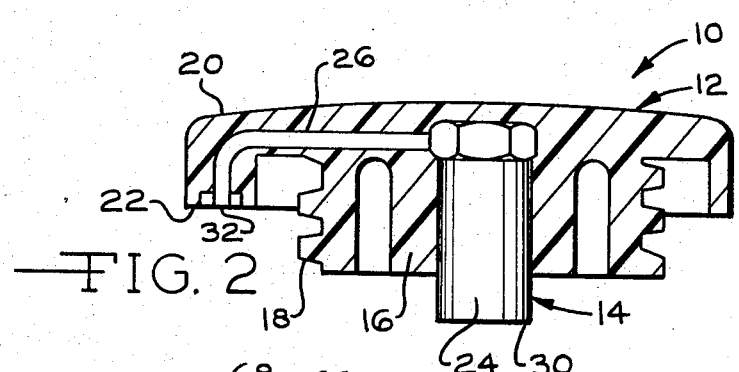
FIG. 2
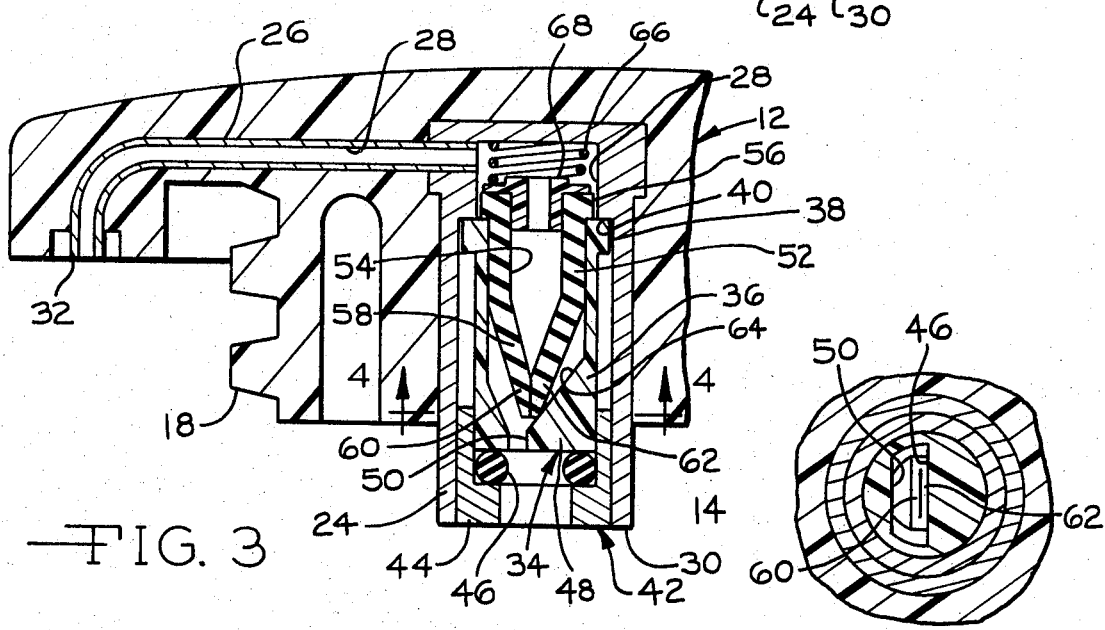
FIG. 3
FIG. 4

VENT CAP

REFERENCE TO RELATED APPLICATION

This application relates to the disclosure of United States Application, Ser. No. 245,436, filed Apr. 19, 1972, entitled "Vent Apparatus", now U.S. Pat. No. 3,789,871, issued Feb. 5, 1974.

BACKGROUND OF THE INVENTION

The present invention relates to vent closures for fuel tanks, and particularly to a vent closure that includes a resilient material valve for vacuum relief and excessive pressure relief with respect to the fuel tank.

It is known to provide vent apparatus of the type disclosed in the aforesaid U.S. Pat. No. 3,789,871, and it is also known to make closure caps for fuel tanks that include vent apparatus of various types. In some instances the closure cap is provided with a check valve, and a passageway in which the valve is located must have its outer end positioned so that it will not readily be obstructed. For various reasons it is frequently desired to produce the cap by molding thermosetting materials, such as phenolic resins, but when so doing suitable vent passageways are not readily provided. The normal procedure is to drill intersecting holes into the molded cap for this purpose, and then to plug certain of the open ends, which procedure involves added costs and increases the likelihood that imperfect passageways will be provided. Thus, the prior art fails to provide a closure cap that enables optimum venting to be achieved commensurate with relatively low cost of production and high quality of manufactured products.

SUMMARY OF THE INVENTION

The present invention has overcome inadequacies of the prior art, and provides a vent cap for a fuel container that in a preferred embodiment includes a molded closure body in which a vent apparatus is located characterized by its unitary construction. The vent apparatus has a rigid passageway which houses the valve element and related components so that when the molding operation is completed, no further steps of fabricating the passageway are required. By virtue of the fact that the vent apparatus has been prefabricated and the working parts are in effect encapsulated within the unitary casing or passageway, maximum assurance is provided that continuous and effective venting will be realized, and these benefits will be obtained at relatively low cost.

According to one form of the present invention, a vent cap for a fuel container is provided comprising a molded closure body defining a central portion for securing the cap to an opening in the container and an integral radially outer hand-grip portion, and vent apparatus molded in said body. The vent apparatus comprises a casing in said central portion having a lower end for communication with the interior of the container and a tube extending radially from the upper end of the casing and terminating in a downwardly directed end in the hand-grip portion for communication with the surrounding atmosphere. Thus, the casing and the tube define a vent passageway for providing the desired communication between the interior of the container and the surrounding atmosphere. A valve element holder is mounted in the passageway in the casing and has means defining an offset throughway. A resilient unitary valve element is provided that has a tubular body portion with a peripheral flange that is seated in sealing relation on the valve element holder and a duck bill portion extending from the tubular portion towards said lower end of the casing. The duck bill portion has lips that fit into the throughway, one of the lips being urged against the other lip by one surface of the throughway. Thus, the lips are normally maintained in a closed position to assure that fuel cannot creep upward through the lips in the event that such lips are slightly spaced apart due to manufacturing imperfections or other adverse conditions. Bias means are provided in the casing urging the valve element towards said lower end to its seated position, the biasing means being responsive to a pressure above a preselected magnitude from the direction of the lower end of the casing to allow the valve element to unseat so that fluid can flow through the passageway around the duck bill portion from the lower end to the upper end of the casing to accommodate excessive vapor pressures that may build up in the fuel tank. The ends of the lips are out of engagement with other surfaces of the throughway so that air can flow from the upper end to the tank through the duck bill portion when the atmospheric pressure is greater than the pressure within the fuel tank.

Thus, it is an object of the present invention to provide an improved vent cap for a fuel container.

Other objects of this invention will appear in the following description and appended claims, reference being had to the accompanying drawings forming a part of this specification wherein like reference characters designate corresponding parts in the several views.

BRIEF DESCRIPTION OF THE DRAWING

FIG. 1 is a bottom plan view of a vent cap embodying the present invention;

FIG. 2 is a sectional view taken on the line 2—2 of FIG. 1;

FIG. 3 is an enlarged fragmentary sectional view similar to that of FIG. 2, but showing in section the vent apparatus; and FIG. 4 is a sectional view taken on the line 4—4 of FIG. 3.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology herein is for the purpose of description and not of limitation.

Referring now to the drawing, the invention will be described in greater detail. The vent closure or cap 10 comprises a molded closure body 12 and vent apparatus 14 molded in the body 12.

The molded closure body 12 includes a central portion 16 of cylindrical configuration which is threaded at its outer periphery as at 18 for screwing the vent cap into a threaded opening of a fuel tank (not shown). Extending radially outwardly from the central portion 16 is a hand-grip portion 20 which has a lower surface 22 which will be located in spaced relationship above the surface of the fuel tank (not shown). The molded closure body 12 preferably is made of a suitable plastic material such as thermosetting phenolic resins.

Molded in the closure body 12 is the vent apparatus 14 which in its assembled condition is a unitary structure having a casing 24 and a tubing 26 extending radially outwardly from the casing 24. The casing 24 and the tube 26 define a passageway 28 which extends from the lower end 30 of the casing 24 to the terminal end 32 of the tube 26 to provide communication between the interior of the fuel tank (not shown) and the external atmosphere. As seen best in FIG. 3, the tube 28 is integrally connected to the casing 24 so that an integral passageway is provided which can be molded in the closure body 12 eliminating the need for any further operations being formed on the closure body 12 for the purpose of providing a vent passageway.

Located within the passageway 28 and forming a part of the vent apparatus 14 is the check relief valve assembly 34. This assembly includes the holder 36, which is cup-shaped in the disclosed embodiment, and has a peripheral lip 38 seated against the internal annular shoulder 40 in the casing 24. The holder 36 is held in its illustrated position by means of the retainer assembly 42 comprising the annular retainer 44 and the resilient O-ring 46. Preferably, the retainer 44 will be press-fitted into the casing 24 in the illustrated position.

The cup-shaped holder 36 has a bottom wall 48 which closes the passageway 28 except for a transverse slot or offset throughway 50 which is off-set to one side of the axis of the cup-shaped holder 36. A check relief or resilient unitary valve element 52 has a tubular body portion 54 with a peripheral flange 56 seated in sealing relationship on the peripheral lip 38. The valve element 52 also has a duck bill portion 58 which is an extension of the tubular body portion 52 and defines a pair of lips 60 and 62. As explained in the aforesaid pending application, Ser. No. 245,436, the duck bill portion 58 may have been manufactured with the lips 60 and 62 slightly spaced apart, when the duck bill portion is in its unstressed state. This small spacing may be the result of imperfect manufacturing operations, or it may be the result of other conditions affecting the valve element 52.

The resilient unitary valve element 52 is dimensioned relative to the valve element holder 36 so that the lips of the duck bill portion will extend into the transverse slot or throughway as seen best in FIG. 3. When inserted in this manner, the lip 62 will be biased by the one wall or surface 64 into engagement with the other lip 60 so as to close any small gap that may exist between these lips. By virtue of this construction and arrangement, assurance is provided that during operation of the engine with which the vent cap 10 is associated, the vibrations of the fuel tank will not cause fuel to creep upward through the passageway 28, because the valve element 52 will always be maintained in a closed position at the lips 62.

Spring biasing means are located at the upper end of the valve element 52 to bias it into the position shown in FIG. 3, the biasing means including the compression spring 66 and the spring retainer 68. The spring biasing means are provided so that if excessive pressure should build up in the fuel tank by virtue of temperature conditions or the like, the valve element 52 may be unseated from the holder 36 against the biasing action of the spring 66 to allow the higher gas pressures to be dissipated by discharge of the gases around the outer periphery of the valve element 52 and outward to the atmosphere via the tube 28. Thus, the vent apparatus 14 can readily accommodate vapor pressure from within the tank (not shown) which become excessively great, and conversely, when gasoline is withdrawn from the fuel tank (not shown) so that a pressure drop occurs within the tank, air can be vented through the passageway 28 to the fuel tank.

From the foregoing description it will be recognized that a vent cap is provided which has a molded closure body within which is molded unitary vent apparatus which includes the passageway 28 and check relief valve apparatus completely encapsulated within the passageway to facilitate a simplified manufacturing operation and one which will assure that the passageway 28 will always remain unobstructed.

It is claimed:

1. A vent cap for a fuel container comprising a plastic molded body defining a central portion for securing the cap to a neck of the fuel container and an integral radially outer hand-grip portion, and vent apparatus molded in said body, said vent apparatus including a passageway extending from the base of said central portion for communication with the interior of the fuel container to a lower surface of the hand-grip portion for communication with the atmosphere, said vent passageway being defined by a metallic casing in said central portion having an open lower end for communication with the interior of the fuel container and a metallic tube extending radially from said casing and terminating in the hand-grip portion in a downwardly directed open end for communication with the atmosphere, and a check relief valve element mounted in said casing in said passageway.

2. A vent cap for a fuel container comprising a molded closure body defining a central portion for securing the cap to an opening in the container and an integral radially outer hand-grip portion, and vent apparatus molded in said body comprising a casing in said central portion having a lower end and a tube extending radially from the upper end of said casing and terminating in a downwardly directed end in said hand-grip portion, said casing and said tube defining a vent passageway for providing communication between the interior of said container and the surrounding atmosphere, a valve element holder mounted in the passageway in said casing and having means defining an offset throughway, a resilient unitary valve element having a tubular body portion with a peripheral flange that is seated in sealing relation on said holder and a duck bill portion extending from said tubular body portion toward said lower end of the casing, said duck bill portion having lips that fit into said throughway, one of said lips being urged against the other lip by one surface of said throughway, biasing means urging said valve element toward said lower end to its seated position and responsive to a pressure above a selected magnitude from the direction of said lower end of the casing to allow said valve element to unseat so that fluid can flow through said passageway around said duck bill portion from said lower end to the upper end of said casing, the ends of said lips being out of engagement with other surfaces of said throughway so that fluid can flow from said upper end to said one end through said duck bill portion when the fluid pressure at said other end is greater than at said one end.

3. The vent cap that is defined in claim 2, wherein said molded closure body is made of a phenolic resin and said casing and said tube are made of metal.

4. A vent cap for a fuel container comprising a molded closure body adapted to be secured to an opening in the container and defining a central portion and an integral radially outer portion, and vent apparatus molded in said body comprising a passageway extending between a lower surface of said radially outer portion and a surface of said central portion adapted to be confined within said container, a check relief valve element mounted in said passageway, said passageway including a casing located in said central portion in which said valve element is mounted and a tube connected to and extending from said casing to the terminal end of the passageway at said radially outer portion, said casing being open at the bottom and including a downwardly facing abutment on its inner periphery, and said vent apparatus including a valve holder secured in said casing against said abutment, said valve element being seated in said valve holder.

5. A vent cap for a fuel container comprising a molded closure body adapted to be secured to an opening in the container and defining a central portion and an integral radially outer portion, and vent apparatus molded in said body comprising a passageway extending between a lower surface of said radially outer portion and a surface of said central portion adapted to be confined within said container, a resilient unitary valve element mounted in said passageway having a tubular body portion and a duck bill portion extending from said tubular portion, said tubular body portion being mounted in said passageway so that the duck bill portion extends toward said surface of said central portion, and means in said passageway engaging one of the lips of the duck bill portion to urge the lips together, said passageway including a casing located in said central portion in which said valve element is mounted and a tube connected to and extending from said casing to the terminal end of the passageway at said radially outer portion, said casing being open at the bottom and including a downwardly facing abutment on its inner periphery, and said vent apparatus including a valve holder secured in said casing against said abutment, said valve element being seated in said valve holder.

6. The vent cap that is defined in claim 5, wherein said valve apparatus includes an annular retainer assembly fitted into the lower end of said casing and engaging said valve holder for retaining the latter against said abutment.

7. The vent cap that is defined in claim 5, wherein said casing is closed at the top and spring means are operably positioned between the closed top of said casing and said valve element to urge said valve element into its seated position in said valve holder.

8. The vent cap that is defined in claim 7, wherein said means in said passageway comprises an offset throughway in said valve holder, one surface of which engages said one lip of the duck bill.

* * * * *